Patented July 29, 1947

2,424,637

UNITED STATES PATENT OFFICE 2,424,637

PROCESS AND CATALYST FOR AROMATIZING ALIPHATIC HYDROCARBONS

John O. Smith, Jr., Cranford, N. J., assignor to Tide Water Associated Oil Company, Bayonne, N. J., a corporation of Delaware No Drawing. Application June 3, 1943, Serial No. 489,450

4 Claims. (Cl. 260—668)

The present invention relates to reactions involving catalytic conversion of aliphatic and alicyclic hydrocarbons; and more particularly to a method for the production of cyclic hydrocarbons from hydrocarbons containing straight chains of at least six carbon atoms by dehydrogenation reactions. The invention has special application in the dehydrogenation of naphthenes and the dehydrogenation and cyclization of straight chain paraffins to produce aromatics. The method of this invention may be applied to hydrocarbon materials as pure compounds or to hydrocarbon mixtures. Also included in the invention is a catalyst composition effective for use in said methods and reactions.

It is known that certain hydrocarbons, particularly those occurring in gasoline fractions and other petroleum fractions, can be aromatized by reactions involving dehydrogenation. For example, hydrocarbons occurring in certain naphthas, such as cyclohexane and methyl cyclohexane, paraffins with straight chains of six or more carbon atoms, cyclopentanes with one or more carbon atoms in a side chain when treated in pure form or in mixtures under proper conditions may be aromatized with evolution of hydrogen gas. Aromatics are produced in various refining operations, particularly in cracking methods in which aliphatic hydrocarbons are subjected to intensive thermal cracking. However, the yields of aromatics resulting from such methods have been generally small and because of this and other difficulties resort has been made to aromatization reactions involving use of catalysts. In general the catalysts employed have been certain oxides of metals.

Despite the large number of catalysts heretofore proposed for this and other purposes, the art has developed mainly in empirical manner due to the difficulties usually encountered in catalytic research of reasoning by analogy. A given catalyst effective in one type of reaction cannot be predicted with certainty to be effective in other reactions. The present invention is concerned with use in dehydrogenation reactions of a specific composite catalyst producing particularly advantageous results in aromatization of hydrocarbons of the type set forth hereinabove.

Stated more specifically, the method of this invention comprises the production of aromatic hydrocarbons by contacting suitable aliphatic hydrocarbons with catalysts comprising oxides of molybdenum and zirconium associated with a carrier or supporting material under conditions conducive to the formation of the desired products. Of the various carrier materials activated alumina in granular form is particularly suitable for use with the oxides of this invention. Desirably the zirconium oxide is first applied to the alumina followed by application of the molybdenum oxide, but other modifications are within the scope of the invention. These include the reverse order of deposition from that stated as well as alternate successive depositions of the two oxides continued until the required amounts of each have been deposited. Deposition of the oxides on the carrier may be conveniently effected by heating suitable sized granules of the carrier material with salts of the metals which are decomposable to the oxides by heating. More specifically, in preparing a composite catalyst which will be herein referred to as "molybdenum oxide on zirconium oxide on alumina," it has been found desirable to proceed as follows:

Dissolve in ice water sufficient zirconium tetrachloride to produce on heating the desired proportionate amount of zirconium oxide and mix with alumina particles. The particle size of the alumina may vary to suit requirements. Good results have been obtained using particle sizes of 20–40 mesh and 12–14 mesh, but other particle sizes may be used. Dry the mixture of alumina and zirconium tetrachloride on a steam bath to remove water. Then add sufficient ammonium molybdate solution to produce the desired proportionate amount of molybdenum oxide, mix thoroughly and dry on a steam bath. Then heat the resulting product on a hot plate to volatilize ammonium chloride, being careful not to overheat. In this latter step the temperature of the material should not be allowed to exceed about 1400° F.

The composite catalyst so produced may be further treated prior to use by heating in the presence of hydrogen at an elevated temperature, as for example at about 950° F. This treatment apparently causes conversion to lower oxides of the metals, probably to $MoO_2$ or $Mo_2O_3$ and $ZrO_2$. Alternately instead of reducing the catalyst with hydrogen prior to use the reduction may be accomplished in the course of its use in the intended aromatization reactions, in which case the hydrocarbons treated apparently reduce the oxides.

After catalyst deposit has built up during the conversion reaction to a point where regeneration is desirable the catalyst may be revivified or regenerated by passing air therethrough at a temperature sufficiently high to cause carbon dioxide formation. Temperatures on the order of 950-1000° F. are in general satisfactory. When no more CO₂ is evolved regeneration treatment is stopped and the catalyst is ready for preliminary reduction with hydrogen or reuse as stated.

Advantageous results are brought about by the presence of zirconium oxide in the catalysts of this invention. Due to some coaction or enhancement exerted by the zirconium oxides the nature of which is not entirely understood the use of these catalysts in aromatization methods generally results in higher liquid yields, higher conversion to aromatics based upon the theoretical, and less catalyst deposit as compared to similar catalysts containing no zirconium oxide.

The improvement as respects lower catalyst deposit is in itself a major advance since the more rapidly a catalyst is fouled by coke deposit the more rapidly the rate of conversion to aromatics drops off and the sooner it must be regenerated. Furthermore, the formation of large coke deposits gives rise to difficulties in regeneration.

In addition to these advantages the catalysts of this invention are characterized by relatively high stability against heat, this being due to a thermal stabilization effect exerted by the zirconium oxide. As evidence of their heat-stable character, catalysts of this invention withstand heating in an air stream for one hour at temperatures over 1500° F. without decrease in aromatizing activity, whereas similar catalysts containing no zirconium oxide are inactivated by such treatment.

By way of specific embodiment normal heptane was passed in vapor phase over a catalyst prepared as above described and consisting of 3% molybdenum in the form of molybdenum oxide on 1% of zirconium oxide on "Alorco" grade A activated alumina, at a temperature of about 950° F.

Compared with a catalyst of similar composition but containing no zirconium oxide and tested under the same conditions, the catalyst containing zirconium oxide gave less conversion to olefines, a higher liquid yield containing a higher proportion of aromatics (toluene) and showed considerably less reduction in its initial activity during the run. The aromatizing efficiency, i. e., per cent aromatics formed based on the theoretical, was considerably higher for the molybdena-zirconia catalyst than in the case of the molybdena catalyst.

Certain desired or optimum results obtain in particular proportional amounts and compositions of the catalyst constituents. I have found that relatively low proportions of molybdenum oxide in the catalyst, as from about 1% to about 5% (based on molybdenum content), favor low rate of catalyst deposit, high aromatizing efficiency and high catalyst life. Amounts of more than about 5%, while advantageous in producing higher proportions of aromatics in the product, at the same time result in higher rates of catalyst deposit and shorter catalyst life. For special applications where catalyst life and catalyst deposit are not as important as obtainment of a product containing maximum amounts of aromatics catalysts of this invention having higher proportional amounts of molybdenum oxide may be employed to advantage. To this end catalysts containing up to 12% or in some cases even more of molybdenum oxide may be used.

Sufficient of the zirconium oxide constituent should be present to provide in the catalyst the described cooperation or enhancement and stability. Normally, as little as 1% of this constituent is satisfactory, but somewhat higher amounts ordinarily are not objectionable. In general and for practical purposes the presence of less than about 10% of zirconium oxide will suffice.

The base material which constitutes a support or carrier for the oxides of molybdenum and zirconium should be of proper physical character or structure. In addition it is desirable that it should be free of siliceous materials, or at most should be low in percentage of siliceous material; for example, not more than a few per cent and preferably less than one per cent for best results, since in general the rate of catalyst deposit increases and other disadvantages arise with increase in silica content.

Thus, it is apparent that by use of particular selected constituents in particular proportional amounts there are provided, according to the invention, catalysts having a combination of essential attributes valuable in practical use.

The reaction temperature may be varied from that stated hereinabove. The operating temperature in any case must be high enough to effect the desired reaction and while a specific lower temperature limit naturally cannot be set with arithmetical precision, temperatures below about 700° F. do not give useful results. With charging stocks predominantly straight chain in character the lowest useful temperature is about 800° F. Likewise, a precise upper temperature limit holding for all cases cannot be stated since this factor varies with other conditions and with different charging stocks. The upper temperature limit depends largely upon the rate of cracking occurring with the particular charging stock and space velocity or contact time used. The yield of aromatics increases with the reaction temperature. Likewise the rate of cracking increases with temperature and if too high a temperature is used excessive cracking will occur, i. e., a temperature will be reached at which the relative rate of cracking will predominate over the formation of aromatics as evidenced by material reduction in aromatic yield due to high conversion of the charge to cracked products. This temperature will usually be in the neighborhood of 1000° F. It is desirable to operate at temperatures at which the rate of formation of the desired aromatic products continues to predominate over the cracking rate.

By use of appropriate charging materials there may be prepared by dehydrogenation or dehydrogenation and cyclization various hydrocarbons, such as toluene, benzene, xylene, and the like. An important aspect of the invention resides in the aromatization of specific petroleum fractions high in seven carbon atom hydrocarbons to produce therefrom good yields of toluene. Thus, aromatics may be effectively produced by the method of the invention using as charging stock fractions of gasoline from Pennsylvania crude boiling between 80° C. and 100° C. and composed mainly of seven carbon atom hydrocarbons including heptanes such as mono-iso-heptanes and normal heptane and a small proportion of naphthenes. As an example, a fraction of Pennsylvania gasoline boiling between 82° C. and 100° C. was subjected to dehydrogenation using as the catalyst 3% molybdenum oxide on 1% zirconium oxide on activated alumina at about 950° F., and high yield of aromatics was obtained with low olefin formation. In still another example comparable aromatizing effectiveness and low olefin production was obtained using a catalyst prepared by depositing first molybdenum oxide and then zirconium oxide on activated alumina, in which the charging material and operating conditions were as in the example just stated. The catalyst of this invention is particularly distinctive in its aromatizing effectiveness when using naphthenes as charging material and in such cases especially high yields of aromatics are obtainable. Thus, for example, the dehydrogenation of cyclohexane by use of the catalyst is accomplished with marked effectiveness.

In ordinary operation where production of aromatics is the sole or major consideration, it is desirable to operate at normal or only moderately elevated pressures, but super-atmospheric pressures may be used in some cases in the production of special effects or products. When, besides aromatics, an increased yield of iso-paraffins is also desired, the use of super-atmospheric pressures on the order of say 1000 to 2000 pounds per square inch are beneficial since such pressures favor formation of iso-paraffins. When employing super-atmospheric pressures the catalyst is more rapidly poisoned. Catalyst poisoning may be reduced by conducting the catalytic conversion in the presence of hydrogen, which may be introduced into the catalyst chamber. Thus it will be apparent that operating conditions may be varied within the scope of the invention, depending upon results desired.

This application constitutes a continuation-in-part of my copending application, Serial No. 437,411, filed April 2, 1942.

I claim:

1. Method for aromatizing aliphatic hydrocarbons without excessive coke formation which comprises contacting said hydrocarbons with an aromatizing catalyst under aromatizing conditions, said catalyst comprising about 1 to 10% by weight of zirconium oxide and about 1 to 12% of molybdenum oxide on alumina containing not more than about 1% silica.

2. Method for producing aromatics from aliphatic hydrocarbons without excessive formation of coke which comprises contacting said hydrocarbons with an aromatizing catalyst under aromatizing conditions, said catalyst comprising about 1% by weight of zirconium oxide and about 3% by weight of molybdenum oxide on alumina containing not more than about 1% silica.

3. An aromatizing catalyst consisting essentially of about 1 to 10% by weight of zirconium oxide and about 1 to 12% of molybdenum oxide on active alumina containing not more than about 1% silica, said catalyst being effective for aromatization of aliphatic hydrocarbons without excessive coke formation.

4. An aromatizing catalyst consisting essentially of about 1% by weight of zirconium oxide and about 3% by weight of molybdenum oxide on active alumina containing not more than about 1% silica, said catalyst being effective for aromatization of aliphatic hydrocarbons without excessive coke formation.

JOHN O. SMITH, JR.

REFERENCES CITED

The following references are of record in the file of this patent:

UNITED STATES PATENTS

| Number | Name | Date |
|---|---|---|
| 2,212,112 | Clausen | Aug. 20, 1940 |
| 2,257,082 | Yarnall | Sept. 23, 1941 |
| 2,258,111 | Engel | Oct. 7, 1941 |
| 2,322,857 | Liedholm | June 29, 1943 |
| 2,275,441 | Kanhofer I | Mar. 10, 1942 |
| 2,297,773 | Kanhofer II | Oct. 6, 1942 |
| 2,322,794 | Egloff | June 29, 1943 |
| 2,288,336 | Welty, Jr., et al. | June 30, 1942 |
| 1,996,009 | Krauch et al. | Mar. 26, 1935 |
| 2,273,338 | Thomas | Feb. 17, 1942 |
| 2,231,446 | Grosse | Feb. 11, 1941 |